T. P. CHRISOMALIS.
TIRE CASING.
APPLICATION FILED SEPT. 28, 1916.
1,235,877.
Patented Aug. 7, 1917.
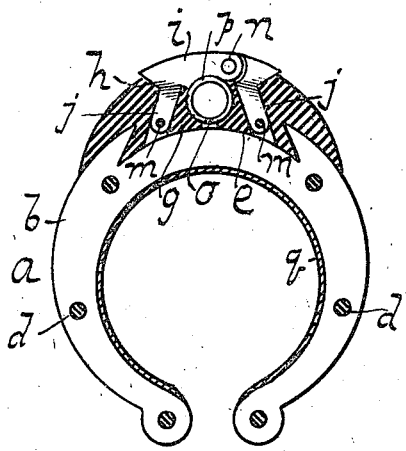
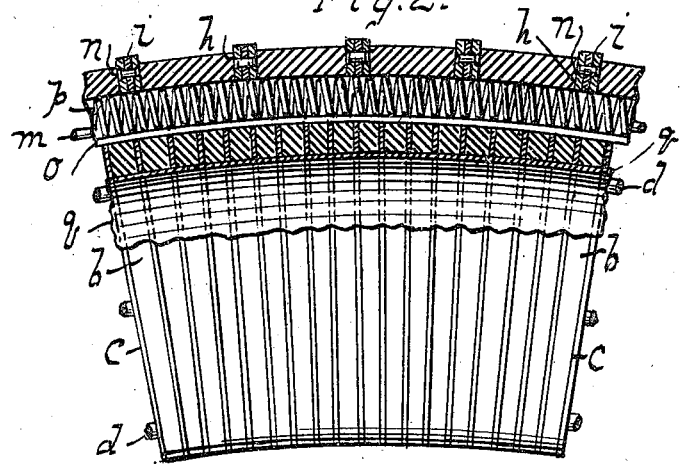
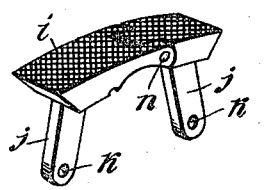
Attest:
William Miller
Inventor:
Theodore P. Chrisomalis
by
Attys

UNITED STATES PATENT OFFICE.

THEODORE P. CHRISOMALIS, OF NEW YORK, N. Y.

TIRE-CASING.

1,235,877. Specification of Letters Patent. Patented Aug. 7, 1917.

Application filed September 28, 1916. Serial No. 122,597.

*To all whom it may concern:*

Be it known that I, THEODORE P. CHRISOMALIS, a citizen of the United States, residing at New York, county of New York, State of New York, have invented new and useful Improvements in Tire-Casings, of which the following is a specification.

This invention relates to a casing which is essentially adapted for covering a pneumatic tire, and it fundamentally includes devices connected to the casing for preventing the tire from skidding.

The invention is designed to increase the traction of the tire, and at the same time add to its resiliency.

The invention is more fully described in the following specification and claims and illustrated in the accompanying drawing in which:—

Figure 1 represents a vertical transverse section of the tire embodying this invention.

Fig. 2 is a longitudinal section of the same.

Fig. 3 is a perspective view of the buffer member.

In this drawing the letter $a$ designates a casing which as shown is preferably of the clencher type of shoe to cover a pneumatic tube. The casing is built up of a number of flat sections of leather $b$ arranged adjacent to each other, and the sections are shaped with curved periphery and concaved inner portion as denoted in Fig. 1, to fit over a pneumatic tube. Between each section is interposed a sheet of elastic $c$ corresponding to the contour of the leather and cemented or glued to the sections. The sheets of elastic bind the numerous sections together and a series of wires or cords $d$ threaded through holes in each section with their ends fastened together will prevent the sections from pulling apart.

In the outer portion of the casing is located a dove-tailed groove $e$ extending about the casing. An annular elastic tread member $f$ is provided with a dove-tailed tongue $g$ for engagement with the groove. The tongue and groove can be cemented together in order to prevent the tread from circumferentially creeping. Arranged at intervals in the tread member are transverse slots $h$ each slot being for the insertion of a metal buffer $i$ having roughened or knurled face as indicated in Fig. 3 to grip or contact with the ground. The buffer member is provided with a pair of legs $j$ fitted into a pair of the slots. At the lower portion of each leg is formed a hole $k$ for coaction with a wire or cord $m$ threaded through a hole in the tread $f$ and fastened at its ends in any convenient way. The legs are jointed together as shown at $n$ in order to adjust themselves to the inclination of the slot when inserting.

In the inner portion of the tread $f$ is located an annular channel $o$, and arranged in the channel is a coiled spring $p$. The spring contacts with the inner surface of the buffer so that when the buffer is forced centripetally, the spring will take up the strain, and thus add to the resiliency of the tread and the buffers.

The casing can be provided with a lining $q$ of rubber or other elastic material cemented to the inner portion of the casing.

I claim:—

1. In a tire the combination with a casing, of a slotted elastic tread member secured to the casing, a series of buffers each being jointed and having legs for engagement with the slots in the tread member.

2. In a tire the combination with a casing, of an elastic tread member provided with inclined slots secured to the casing, a series of buffers each being jointed and having legs for engagement with the slots in the tread member.

3. In a tire the combination with a casing, of an elastic tread member provided with inclined slots secured to the casing, a series of buffers each being jointed and having legs for engagement with the slots in the tread, and means coacting with the legs for fastening the buffers to the tread member.

4. In a tire the combination with a casing, of an elastic slotted, channeled tread member secured to the casing, a series of buffers each having a pair of legs for engagement with the slots, means connected to the legs for fastening the buffers to the tread member, and a coiled spring disposed in the channel to coöperate with the inner portions of the buffers.

In testimony whereof I have hereunto set my hand in the presence of two subscribing witnesses.

THEODORE P. CHRISOMALIS.

Witnesses:
WILLIAM MILLER,
GRACE DE VOE.

Copies of this patent may be obtained for five cents each, by addressing the "Commissioner of Patents, Washington, D. C."